US009202324B1

(12) United States Patent
 Daniel

(10) Patent No.: US 9,202,324 B1
(45) Date of Patent: *Dec. 1, 2015

(54) SYSTEM AND METHOD OF AUTHENTICATING AN IMMIGRATION VISA CARD HOLDER USING AN INTERACTIVE IMMIGRATION CARD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,554

(22) Filed: Apr. 14, 2014

Related U.S. Application Data

(63) Continuation-in-part of application No. 14/188,394, filed on Feb. 24, 2014.

(60) Provisional application No. 61/811,148, filed on Apr. 12, 2013.

(51) Int. Cl.
 *G06F 17/30* (2006.01)
 *G06K 19/06* (2006.01)
 *G07C 9/00* (2006.01)

(52) U.S. Cl.
 CPC ...... *G07C 9/00103* (2013.01); *G06F 17/30879* (2013.01); *G06K 19/06046* (2013.01); *G07C 9/00071* (2013.01)

(58) Field of Classification Search
 CPC ............... G06F 17/30882; G06F 17/30879; G06K 19/06046

USPC .......................................................... 235/380
See application file for complete search history.

(56) References Cited

U.S. PATENT DOCUMENTS

| 2013/0128060 A1* | 5/2013 | Rhoads et al. ............. 348/207.1 |
| 2014/0035720 A1* | 2/2014 | Chapman .................... 340/5.51 |
| 2014/0079281 A1* | 3/2014 | Williams et al. ............. 382/103 |
| 2014/0214547 A1* | 7/2014 | Signorelli et al. ......... 705/14.64 |

* cited by examiner

*Primary Examiner* — Thien T Mai
*Assistant Examiner* — Toan Ly
(74) *Attorney, Agent, or Firm* — Carol N. Green Kaul, Esq.

(57) ABSTRACT

The present invention relates generally to a system and method of interactive verification of an immigration card holder's identity and using a communication device to provide a covert alarm to alert immigration personnel in the event of immigration security breaches. Specifically, using an electronic immigration card with a coded frame displayed thereon that includes one or more hot corners and hyperlinks or icons embedded within the coded frame, which is activated for display when image capturing means scans the coded frame. Upon activation, a hyperlink or icon may be engaged for controlling interactive media content pursuant to a control command associated with the one icon or hyperlink. The media content may include authenticating information, e.g. security questions, photographs and the like. Because the interactive media content is not visible prior to the coded frame being scanned, the immigration card has varied layers of securing the information electronically stored thereon.

20 Claims, 11 Drawing Sheets

SYSTEM AND METHOD OF AUTHENTICATING AN IMMIGRATION VISA CARD HOLDER USING AN INTERACTIVE IMMIGRATION CARD

PRIORITY CLAIM

This patent application is a continuation in part of, and claims priority under 35 U.S.C. §119(e) to U.S. Provisional Patent Application Ser. No. 61/811,148 titled "System and Method of Immigration Processing" filed Apr. 12, 2013, and U.S. Non-Provisional patent application Ser. No. 14/188,394 titled: "A System And Method Of Authenticating Using an Interactive Immigration Visa Card," filed Feb. 22, 2013. The entire disclosure of the patent application is incorporated herein by reference.

FIELD OF THE INVENTION

The present invention relates generally to a system and method of interactive verification of an immigration card holder's identity and using a communication device to provide a covert alarm to alert immigration personnel in the event of immigration security breaches. Specifically, by using an electronic immigration card with a coded frame displayed thereon that includes one or more hot corners with one or more hyperlinks or icons embedded within the coded frame that is activated for display when image capturing means scans the coded frame. Upon activation, a hyperlink or icon may be engaged for controlling interactive media content pursuant to a control command associated with the one icon or hyperlink. The media content may include authenticating information, e.g. security questions, a photograph and the like. Because the interactive media content is not visible prior to the coded frame being scanned, the immigration card has varied layers of securing the information electronically stored thereon.

DESCRIPTION OF THE PRIOR ART

Many immigrants chose to travel to foreign countries for several reasons, political asylum, financial opportunities, and religious freedom to name a few. For countries that issue immigration cards as required documentation for foreigners entering or exiting the country several of these immigration cards have a simplistic security system where the information is encoded on the immigration card in a barcode and/or stored on a magnetic stripe on the back of the card and the remaining information is easily duplicated. Immigration and customs authorities over the years have improved on the photographs and other indicia of ownership that are displayed on the immigration card with the hope that the cards are difficult to duplicate. Nonetheless, fraudulent immigration cards are still not fully eradicated and there still exists a need for a more sophisticated technology where the information stored on the immigration card is not obvious therefore difficult, if not impossible to duplicate.

Further illegal immigration remains an issue for most progressive countries as Immigration and Customs agents at airports, sea ports or other borders on occasion notice suspect passports, suspicious individuals some of whom may be listed on a "No Fly List" trying to enter or exit a country's borders. Therefore, it's always a challenge to apprehend or curtail the movements of the suspect without placing other lawful travelers in a public environment in danger. Thus, there needs to be a system and method of safely processing immigrants and covertly alerting the appropriate authorities of security risks for immediate apprehension with minimal risk and exposure to others' safety.

This invention satisfies these long felt needs in a new and novel manner and solves the foregoing problems that the prior art has been unable to resolve. For a further and more fully detailed understanding of the present invention, various objects and advantages thereof, reference is made to the following detailed description and the accompanying drawings.

Additional objectives of the present invention will appear as the description proceeds. The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
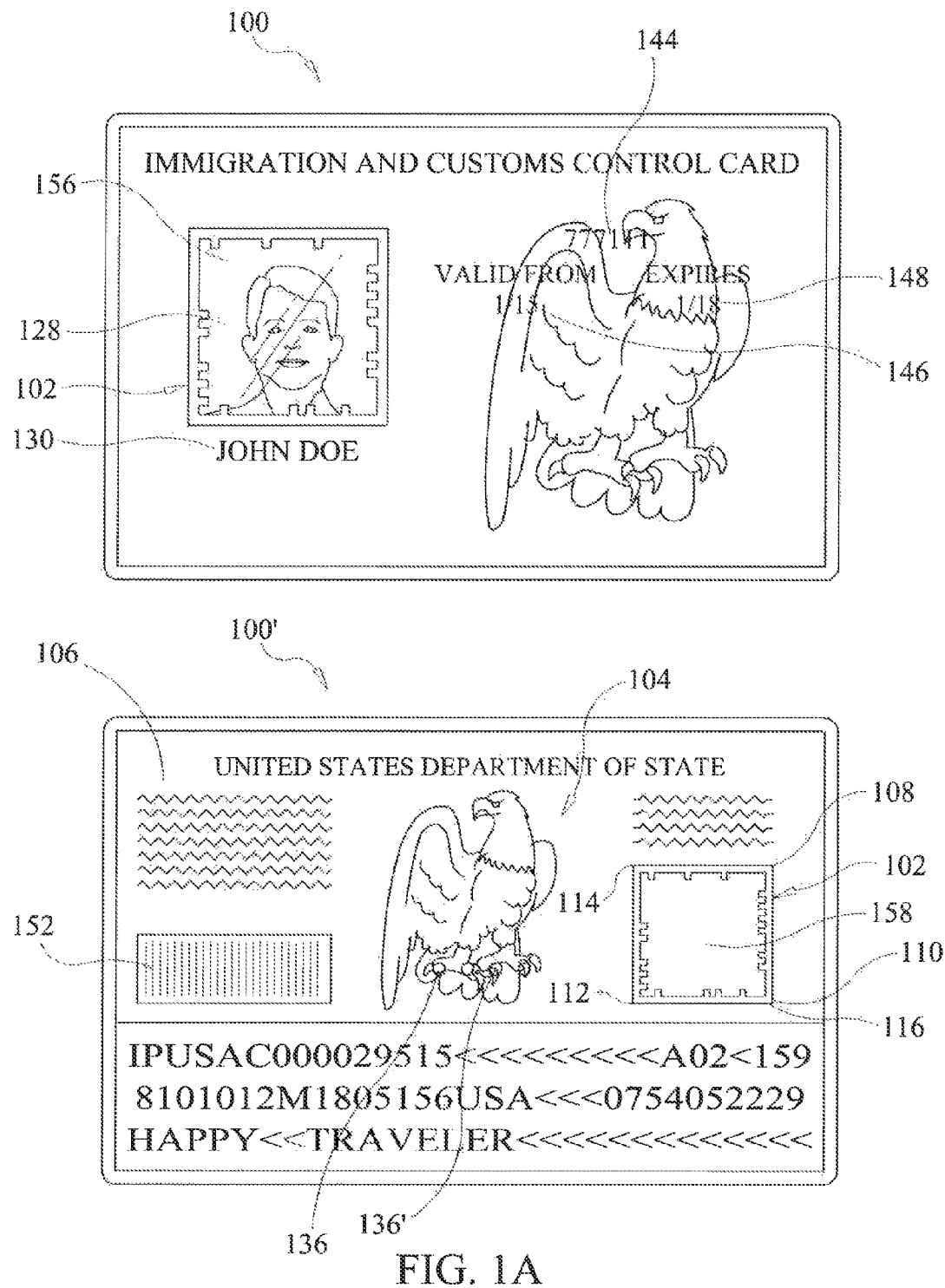
FIGS. 1A-1C are exemplary embodiments of the apparatus of the invention.

The following discussion describes in detail an embodiment of the various systems and methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus

Figure 1B:
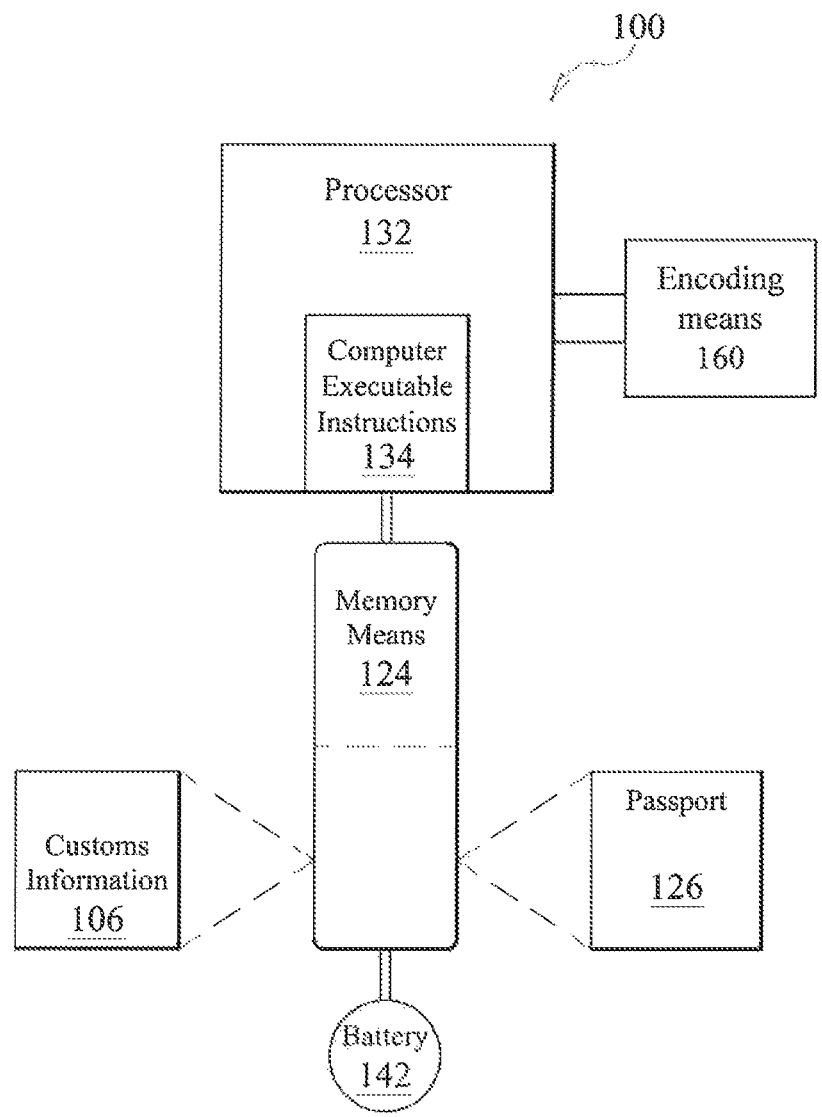
Figure 1C:
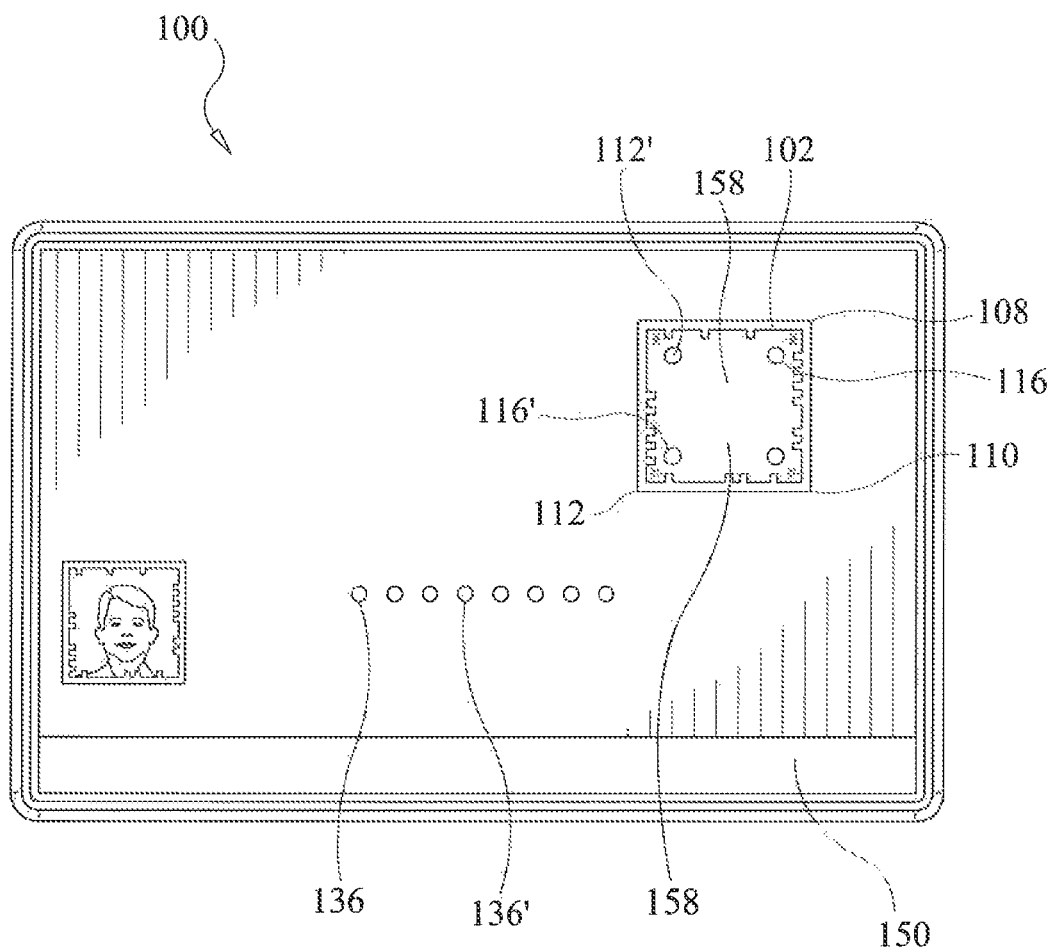

FIGS. 1A-1C are exemplary embodiments of an apparatus 100, i.e. an immigration card 100, of the invention. Immigration card 100 is used for documenting cardholder's authorization to travel to foreign countries with at least one electronically coded frame 102 displayed on the immigration card's exterior 104 that includes cardholder's customs information 106 as entered by an issuing government agency, e.g. Customs, wherein the coded frame 102 includes at least one or more hot corners 108, 110, 112 with at least one or more hyperlinks 114, 114' or icons 116, 116' embedded within the coded frame 102, wherein the at least one or more hot corners 108, 110, 112 with at least one or more hyperlinks 114, 114' or icons 116, 116' are activated for display when image capturing means 118 scans the coded frame 102 and the embedded hyperlinks 114, 114' or icons 116, 116' become visible for engagement. Upon activation, the at least one hyperlink 114 or icon 116 may be engaged for accessing and controlling media content 120 pertaining to the cardholder's customs information 106 using at least one or more control commands 122, 122' associated with the at least one hyperlink 114 or icon 116 by overlaying the coded frame 102 with the at least one hyperlink 114 or icon 116.

Media content 120 may include but is not limited to any one or more of the following: customs information, agency bulletin, agency authentication information, warnings, identification verification information, travel authorization, or security questions. Media content 120 may be displayed in any one or more of the following formats: graphics, pictorial, video, audio or text and/or any combination thereof.

Immigration card 100 is selected from the group of electronic devices consisting essentially of programmable smart cards, memory cards, and processor cards, with at least one memory means 124 positioned therein. Customs information 106 as used herein includes any one or more of the following: passport information 126, declaration of goods, declaration of currency (foreign and local) entering into the country, declaration of foreign countries visited, purpose for visit to foreign countries visited within a certain period of time, and purpose for visit and any other information that the issuing embassy may deem significant enough to store on the immigration card 102. Passport information 126 includes but is not limited to: photograph 128, given names 130, issuing country, passport number, address, nationality, date of birth, place of birth, gender, race, height, color of eyes, date of issue, passport expiration date, occupation, authority, contact information, current visa information, type of visa, visa restrictions and/or any endorsements.

Immigration card 100 may or may not include a microprocessor 132 positioned within. If it includes a microprocessor 134, which may be any type of microprocessor 132, such as, but not limited to, a central processing unit (CPU), a microprocessor, a video processor, a front end processor, a coprocessor, a single-core processor, a multi-core processor, as well as any known microprocessor 132 that is used in the arts.

As shown in FIG. 1B, in some embodiments, embedded within the microprocessor 132 are computer executable instructions 134 readable and executable by the card's at least one microprocessor 132 where the computer executable instructions 134 are operative to perform the varied system and methods disclosed herein including but not limited to: retrieving the cardholder's customs information 106 or passport information 126; or retrieving media content 120 when the coded frame 102 on the immigration card's exterior 104 has been scanned to the extent the media content 120 was stored on the immigration card 100, and the like. Computer executable instructions 134 may be loaded directly on the card's microprocessor 132, or may be stored in its memory means 124, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 134 may be any type of computer executable instructions 134, which may be in the form of a computer program, the program being composed in any suitable programming language or source code, such as C++, C, JAVA, JavaScript, HTML, XML, and other programming languages.

In some embodiments, immigration card 100 includes at least one memory means 124 as exemplified in FIG. 1B. Such memory means 124 may include a hardware component, e.g. storage hardware, in electrical communication with at least one microprocessor 132. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 124 may comprise of both hardware and software components.

Figure 2:
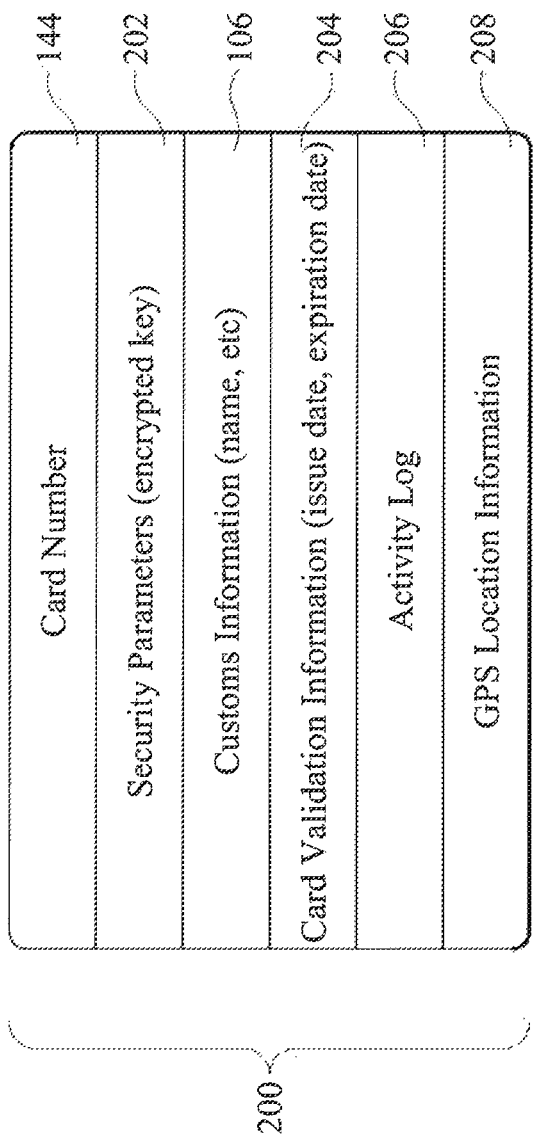
FIG. 2 is an exemplary embodiment of the data structures of the invention.

Memory means 124 may include any one or more of the following stored thereon: customs information 106, passport information 126 and/or any other data structures 200 (as shown in FIG. 2), media content 120, hyperlinks 114, 114', website addresses or Uniform Resource Locators (URLs), and the like. In some embodiments, at least one memory means 124 may be embedded within at least one microprocessor 132 where the information stored therein is encrypted for privacy purposes. In other embodiments, the at least one memory means 124 is adapted with electrical contacts 136, 136' for establishing wired and/or wireless connectivity with external devices, e.g. a computer 138 and/or a card reader 140 and/or at least one microprocessor 134 where the memory means 124 is embedded within.

In some embodiments, immigration card 100 may optionally include a battery 142, which serves as a power source for the at least one microprocessor 132 positioned therein. In some embodiment, immigration card 100 is adapted with external electrical contacts 136, 136' for establishing wired and/or wireless connectivity to a card reader 140 or a charger, e.g. a docking station, and as such may not include a battery 144. In that event, microprocessor 132 detects when the immigration card 100 has been disconnected from an external power source and switches immigration card's power source to an internal power source, such as the battery 144.

Referring back to FIG. 1A, immigration card 100 may include a card number 144, which acts as a unique identifier for the immigration card 100 and/or cardholder. Card number 144 may be assigned by a random number generating program, comprising of numerals, characters, alphanumeric characters or any other unique identifiers that are known and used in the arts. Card number 144 may be assigned using portions of cardholder's social security number or any other customary assignment for immigration card numbers 144, 144' that are known and used in the arts and/or to be created. Prior to being issued to the cardholder, the card number 144 may be recorded by the issuing embassy as another means of identifying the cardholder. Immigration card 100 may also include other indicia of identification, e.g. the immigration cardholder's given names 132. In some embodiments, the cardholder's address may be stored within the immigration card's memory means 124. Each immigration card 100 has an issue date 146 that corresponds to the date the immigration card 100 was issued to the traveler, and/or the card's 102 expiration date 148, which corresponds to the date the immigration card 100 expires and is no longer valid.

Immigration card 100 may include external electrical contacts 136, 136' or a magnetic stripe 150 for making electrical contact with a card reader 140 for reading the electronic data stored thereon. Accordingly, when the immigration card 100 is swiped through a card reader 140 at a customs border at a port of entry, the customs verification application software 154 retrieves the customs information 106 stored thereon. In some embodiments, the immigration card 100 includes a bar code 152 as are customarily used in the arts on the immigration card's exterior 104 encoded with travel authorization information, where a bar code reader may be used to retrieve the electronic data stored thereon.

As shown in FIG. 1A, in some embodiments, the immigration card 100 includes an image 156 within the coded frame 102 adding an additional level of complexity to the security measures for the immigration card 100. Image 156 may be the cardholder's photograph 128, country's emblem or other any other appropriate image 156. As such, a fraudulent duplication necessitates that not only the image 156 within the coded frame 102 must be accurately duplicated but also the corresponding embedded hyperlinks 114, 114' and/or icons 116, 116' embedded within the coded frame 102 in order to access accurate un-displayed media content 120 that remains invisible until activated after being scanned by image capturing means 118 and engaged using the hyperlinks 114, 114' and/or icons 116, 116'. As shown the coded frame 102 is a square but it is understood that the coded frame 102 could've been any other shape that is generally used in the arts for frames, e.g. a blob, a teardrop, a fish, a triangle, a circle and the like.

As shown in FIG. 1C, in some embodiments, the immigration card 100 does not include an image 156 within the coded frame 102 but rather a designated area 158 where the hidden icons 116, 116' and hyperlinks 114, 114' may be engaged to control the media content 120 that remains invisible until activated after being scanned by image capturing means 118 and engaged using the activated and visible hyperlinks 114, 114' and/or icons 116, 116'.

FIG. 2 illustrates, by way of example, collectively the data structures 200 stored within an embodiment of the immigration card 100. Data structures 200 are retained within the electronic data card's memory means 124, which preferably provides sufficient processing resources to facilitate communication and maintain adequate security for the card 102. Data structures 200 may include but is not limited to: card number 144, security parameters 202, customs information 106, card validation information 204, activity log 206, and Global Positioning System ("GPS") location information 208. Card number 144 may act as a unique identifier allowing the system to uniquely recognize and register each immigration card 100 that has been assigned and issued to individual travelers. Security parameters 202 may be provided, that may include an encrypted key(s) of military grade, and or security codes, biometric security features, and/or other security mechanisms.

Customs information 106 may include but is not limited to: passport information 126, declaration of goods, declaration of foreign countries visited, purpose for visit to foreign countries visited within a certain period of time, and purpose for visit and the like. Passport information 126 for the traveler may be stored thereon, which include but is not limited to photograph 128, given names 130, issuing country, passport number, address, nationality, date of birth, place of birth, gender, race, height, color of eyes, date of issue, passport expiration date, occupation, authority, contact information, current visa information, type of visa, visa restrictions and/or any endorsements and the like. It will be understood that access to the passport information 126 may be provided in a hierarchical form associated with security provisions to protect the information stored on the immigration card 100.

Card validation information 204 may include for example issue date 148 that corresponds to the date the immigration card 100 was issued to the traveler, and/or the card's 100 expiration date 148. Activity log 206 may optionally contain a record of all uses of the immigration card 100, e.g. countries for which the immigration card 100 was presented as a means of pre-determining traveler's authorized entry status to different countries.

Figure 3A:
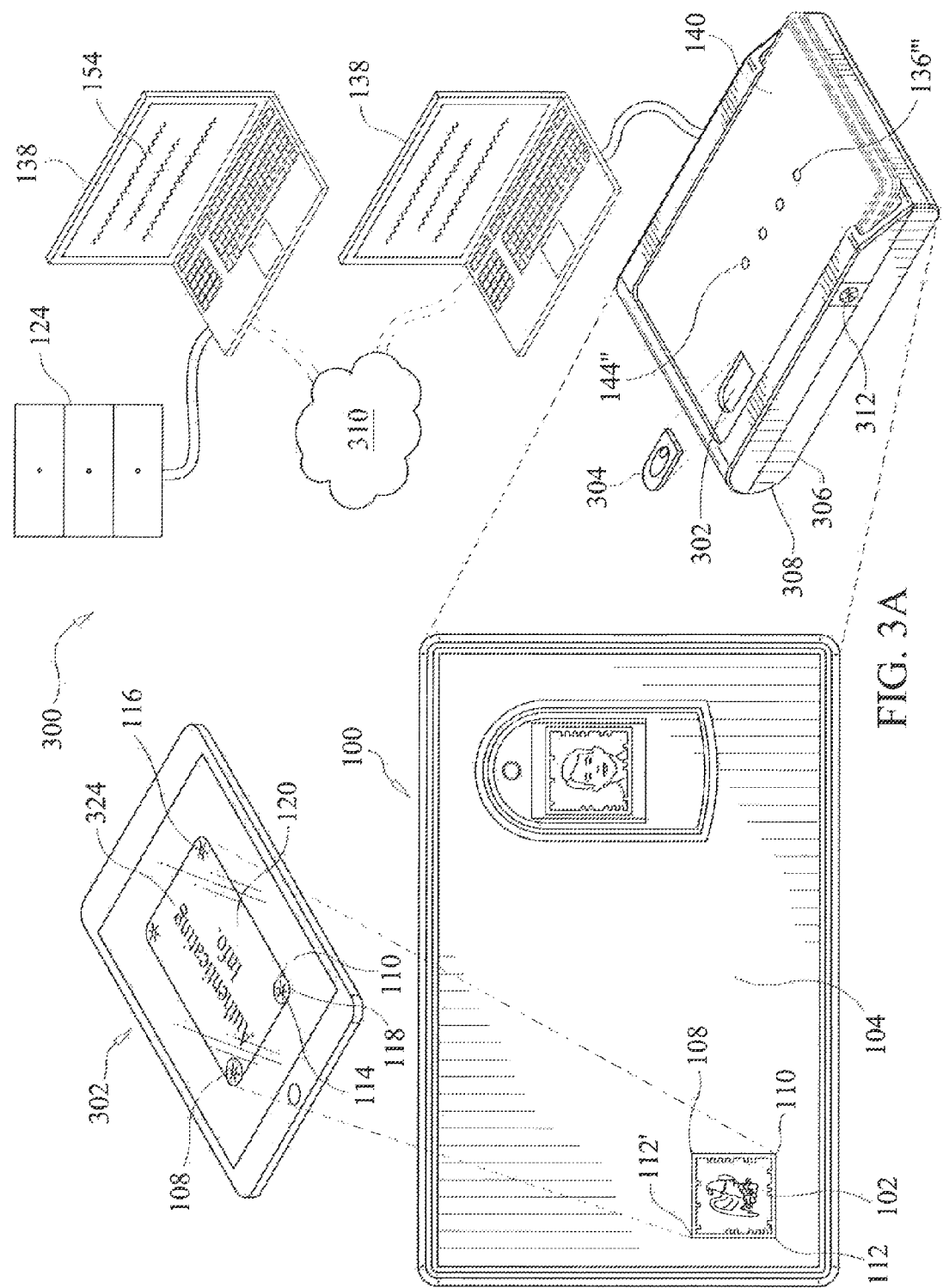
FIGS. 3A-3D show an example of the system of the invention.

In some embodiments, the immigration card 100 and/or the card reader 140 may include GPS location determining means 306 (as shown in FIG. 3A), e.g. a GPS transponder, for determining the location of the immigration card 100 with means for encoding 160 the location into an electronic signal 310 (as shown in FIG. 3A) using e.g. a microprocessor 134, which is transmitted to a computer server 138 where the transmitted electronic signal 310 is decoded and the location of the immigration card 100 or card reader 140 may be monitored in real-time, so that the card reader 140 and/or the cardholder's location can be readily determined such that if apprehension of the traveler is required it can be expedited efficiently. Therefore, the location of the immigration card 100 and as such the location of the traveler may be determined in real-time via global satellite system, where the information, i.e. the longitude and latitude coordinates, may be stored in the GPS location information 208.

Systems & Methods

FIGS. 3A-3D are exemplary embodiments of the system 300 of the invention. System 300 comprises of an immigration card 100 used for travel authorization with at least one electronically coded frame 102 displayed on the immigration card's exterior 104 that includes embedded cardholder's customs information 106 entered by an issuing government agency, wherein the coded frame 102 includes at least one or more hot corners 108, 110, 112 with at least one or more hyperlinks 114, 114' or icons 116, 116' embedded within the coded frame 102, and wherein the at least one or more hot corners 108, 110, 112, 112' with at least one or more hyperlinks 114, 114' or icons 116, 116' are activated for display by scanning the coded frame 102 with image capturing means 118. Upon activation, the embedded hyperlinks 114, 114' or icons 116, 116' become visible for engagement and the activated at least one hyperlinks 114, 114' or icons 116, 116' may be engaged for accessing and controlling corresponding media content 120 that pertains to the cardholder's customs information 106, by overlaying the image 156 or designated area 158 within the coded frame 102 (i.e. absent the image 156) with the activated at least one hyperlink 114 or icon 116 using at least one control command 122 associated with at least one activated hyperlink 114 or icon 116.

System 300 further comprises of a card reader 140 connected to a computer 138, and a microprocessor 132' wherein the card reader 140 is configured for reading the immigration card 100 for verifying the cardholder's authorization for travel using the interactive immigration card 100. Card reader 140 describes an electronic device for scanning and reading electronic data cards, e.g. the immigration card 100 via the magnetic stripe 150 and/or bar code 148, to obtain electronic data stored thereon as are well known and used in the arts. Card reader 140 is connected to a computer 138 either wirelessly or wired, wherein card reader 140 is configured for scanning and reading any one or more of the following: the card number 144, the customs information 106, passport information 126 and/or any other component of the data structures 200 stored thereon. Card reader 140 is further configured for reading and/or writing to the immigration card 100. Card reader 140 as exemplified herein may be adapted with electrical contacts 136", 136'" for establishing wired and/or wireless connectivity to immigration cards 100, 100', 100" and/or the computer 138 and transmits that card number 144 to the computer 138, where the immigration card 100 is authenticated as a validly issued immigration card 100. In some embodiments, a wireless connection may be established, wherein communication access is established with the computer 138 or the immigration card 100 in response to proximity or manual activation of the card reader 140. Card reader 140 may also be integrated within a computer 138 (e.g. with a slot for wired card connectivity), an external device (e.g., USB connection to a small housing), or be integrated into other devices.

Card reader 140 includes biometric verification means 302 positioned thereon and configured for activating the electronic mail card 100 upon validation of cardholder's at least one biometric sample 304; location determining means 306 for determining the location of the card reader 140; communication means 308 for transmitting a signal 310 encoded with the location of the card reader 140; a covert alarm activation switch 312 that can be selectively activated to cause the communication means 308 to transmit the signal 310 encoded with the location of the card reader 140; and control means 314 for causing the transmission of the location encoded alarm signal 310 responsive to a manual activation signal 310 from the covert alarm activation switch 312.

Biometric verification means 302 is configured for receiving the card holder's biometric sample 304 in person, for comparison with the at least one or more biometric identifiers 314, 314' previously stored with the system 300 for cardholder or stored on the immigration card 100. Biometric verification means 302 include but are not limited to: fingerprint recognition means, hand geometry recognition means, palm geometry recognition means, iris recognition means, retina recognition means, speech recognition means and any other biometric verification means 302 that are known and used in the arts.

In some embodiments, biometric verification means 302 may be disposed in communication with the electronic data card's computer processor 132 and, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 302 that are known and used in the arts. Illustratively, as seen in FIG. 3A, the biometric verification means 302 includes a fingerprint scanner, where the electronic data card's computer processor 132" controls the functionality of the fingerprint scanner, generating the varied algorithms for storage of the initial valid biometric samples 304, 304' stored thereon as biometric identifiers 314, 314' and validates images of subsequent biometric samples 304, 304' received from the electronic data card holder contemporaneous to the card reader 140 establishing connectivity to the electronic data card 100.

Card reader 140 includes location determining means 306 for determining the location of the card reader 140 such that it can readily be identified in the event an alarm is activated. For example if a Customs agent at an airport, sea port or other border notices or recognizes suspicious passports or individuals some of whom may be listed on a "No Fly List" trying to enter or exit a country's borders, or for whom an arrest warrant has been issued, a covert alarm activation switch 312 may be selectively activated to cause the communication means 308 to transmit the signal 310 encoded with the location of the card reader 140 to security so that the suspect can be apprehended or questioned without jeopardizing the safety of other individuals in that restricted area.

Communication means 308 is a radio frequency receiver that may be any type of radio frequency receiver, including, but not limited to, a positioning system receiver, such as a global positioning system receiver and a local positioning system receiver, such as a Wi-Fi positioning system receiver. In other embodiments, the communication means 308 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 308 is operative to transmit or receive electronic communications, a signal 310 encoded with the location of the card reader 140 and the like via a short range wireless protocol, such as, but not limited to, a radio frequency receiver, a radio frequency transmitter, or a radio frequency transceiver.

Card reader 140 also comprises of control means 314 for causing the transmission of the location encoded alarm signal 310 responsive to a manual activation signal 310 from the covert alarm activation switch 312. Control means 314 comprises a programmed microprocessor 132' or microcontroller 132', which is connected to a GPS receiver module as are well known and used in the arts. The GPS receiver module may be connected to a GPS antenna, while the microcontroller 132' is also connected to the covert alarm activation switch 312, and to the battery 142. The electronic circuitry can further include a cell phone module, which can be used, together with the covert alarm activator switch 312 and the microcontroller 132', to send out an alarm signal encoded with the GPS location data upon the selective activation of the covert alarm activator switch 312 by the Customs agent.

System 300 further comprises a networked communication device 316 that comprises of: a computer processor 132", a non-transitory computer readable medium connected to the at least one processor 132" that includes computer executable instructions 134' stored on the non-transitory computer readable medium executable by the computer processor 132" and configured for launching the customs verification application program 154, programmed for controlling the media content 120; image capturing means 118; and displaying means 320 for displaying the at least one media content 120.

Figure 3B:
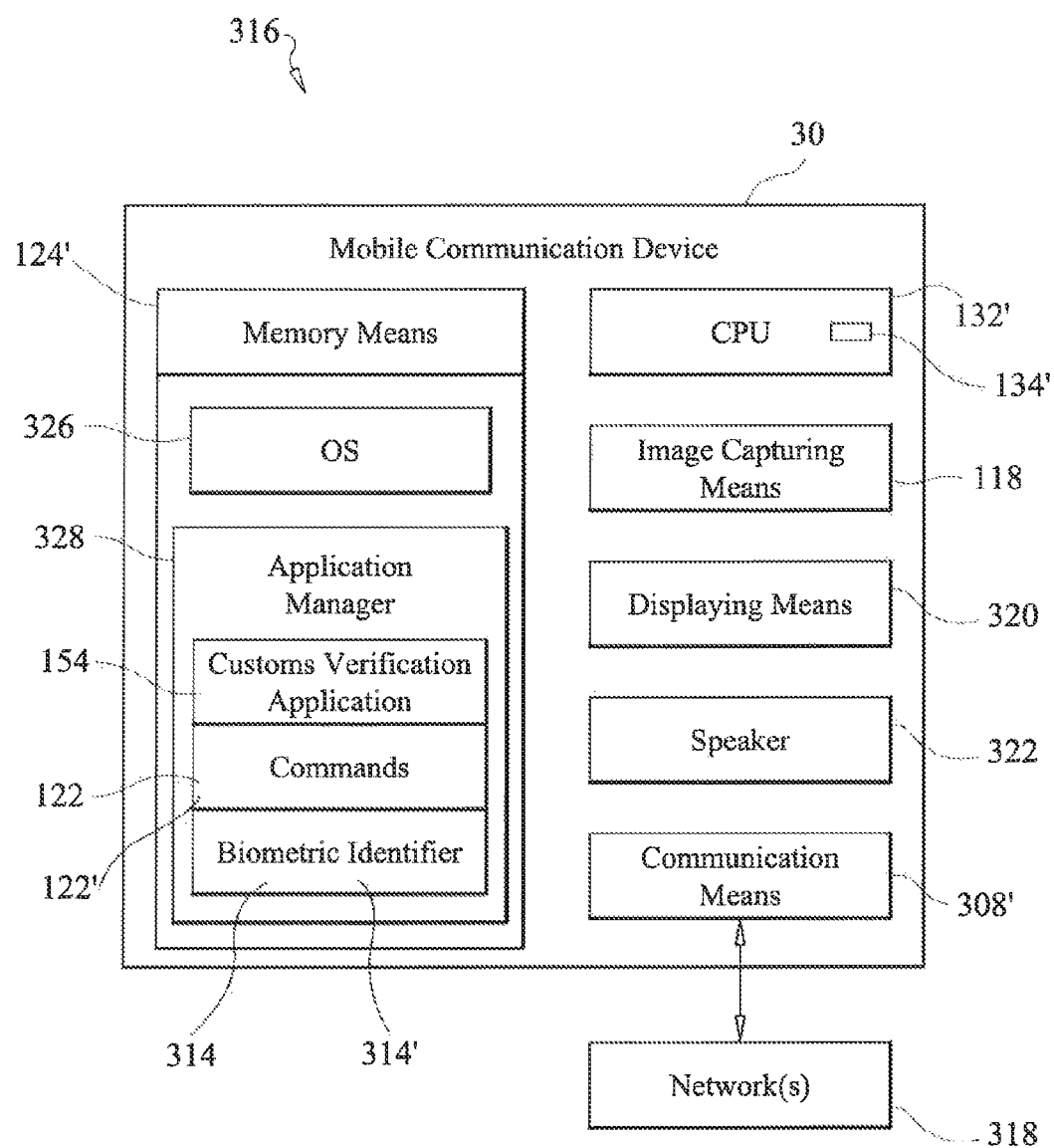

As shown in FIG. 3B, networked communication device 316 comprises of at least one computer microprocessor 132", a non-transitory computer readable medium connected to the at least one microprocessor 132" that includes computer executable instructions 134' readable and executable by the computer microprocessor 132" and configured for launching a customs verification application program 154, programmed for controlling the media content 120; the image capturing means 118; and displaying means 320 for displaying the at least one media content 120.

Networked communication device 316 may be any type of electronic computerized communication device configured with means for communicating wirelessly and/or wired with other electronic computer devices, and includes but is not limited to, a computerized scanner, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 318, local area network 318, wide area network 318, such as the Internet 318, or any other type of network device that can communicate over a network 318. Computer 138 as used herein includes but is not limited to a network enabled computer 138, cellular phones like the networked communication device 316 described herein, a laptop or personal digital assistant subject to wired/wireless connectivity and configured with a computer microprocessor 132".

Networked communication device 316 may include various other hardware components, e.g. memory means 124", and one or more communication means 308' and also software components like the customs verification app 154. The networked communication device's central microprocessor 132" may be programmed to activate the customs verification app 154, e.g. running in background while the networked communication device 316 is powered on, for viewing media contents 120, 120', which may be displayed on the networked communication device's displaying means 320 in for example graphics, pictorial, video, audio, text format or any combination thereof.

In some embodiments, the customs verification app 154 may have its own computer icon 116' or other visual indicator displayed on the networked communication device 316 for launching or providing access to the customs verification app 154. When a Customs' agent selects the respective interactive customs verification app's icon 116 (e.g. by touching a touch-screen, or selecting it using a pointing device, roller ball, arrow keys, or other controller), upon selection, the computer central microprocessor 132" launches the customs verification app 154 and the networked communication device's microprocessor 132", which is electronically connected to the displaying means 320, controls the displaying means 320 to display the customs verification app 154 as launched on the at least one networked communication device's displaying means 320. Once displayed the customs verification app 154 is ready for use in scanning the coded frame 102, the designated area 158 or image 156 within the coded frame 102 on the immigration card 100.

Networked communication device's one or more memory means 124' may be either electrically or mechanically connected to the at least one computer microprocessor 132'. Information stored on the networked communication device's memory means 124' may be retrieved using its microprocessor 132' and may be published by push notification on the networked communication device's displaying means 320 or broadcasted over a speaker 322 using the type and configuration of speakers that are well known and used in the arts for cellular phones.

Networked communication device 316 is equipped with communication means 308', either electrically or mechanically connected to the central microprocessor 132". In the case of electronic connections, the electronic connections may be wired and/or wireless. In some embodiments, communication means 308' may be a wireless communication means 308', which employ short range wireless protocol, such as, but not limited to, a radio frequency transceiver, a radio frequency receiver, and/or a radio frequency transmitter for communicating over the Internet 318 to access for example issuing embassy's websites, other designated URLs and their corresponding media content 120. It is understood that each coded frame 102 is unique, even if the media content 120 is not.

In embodiments where the wireless communication means 308 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 308' may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 308' is operative to transmit or receive electronic communications, i.e. the captured at least one image 156, the coded frame 102, the media content 120, electronic data, audio, videos, text, pictures, graphics and the like via a short range wireless protocol, such as, but not limited to, a radio frequency receiver, a radio frequency transmitter, or a radio frequency transceiver and to communicate and search for the appropriate hyperlink, websites, URLs and the like over the Internet 318.

Networked communication device 316 includes a computer microprocessor 132", disposed within and in electronic communication with the memory means 124'. Computer microprocessor 132" includes computer executable instructions 134' readable and executable by the at least one microprocessor 132". Computer executable instructions 134' are operative to perform all the necessary functions for the networked communication device 316, including but not limited to: automatically launching the customs verification app 154, i.e. running a background service while the networked communication device 316 is powered on, and controlling media content 120 corresponding to the coded frame 102, or at least one image 156 within the coded frame 102, which include at least one or more hot corners 108, 110, 112 with at least one or more embedded hyperlinks 114, 114' or icons 116, 116' within, and the like. The computer executable instructions 134' may be stored on any type of non-transitory or transitory computer readable medium, e.g. the networked communication device's microprocessor 132" or memory means 124'. Memory means 124 include but is not limited to, computer readable media, such as, but not limited to, a hard drive, a solid state drive, a flash memory, random access memory, CD-ROM, CD-R, CD-RW, DVD-ROM, DVD-R, DVD-RW, and the like.

Customs verification app 154, which may be stored in the networked communication device's memory means 124' also comprises of computer executable instructions 134" readable and executable by the at least one microprocessor 132", and is configured for performing any all the necessary functions for the system 100 and methods of the invention, which may include any one or more of the following: controlling media content 120 corresponding to the coded frame 102 and/or the at least one image 156 within the coded frame 102, where the coded frame 102 includes at least one or more hot corners 108, 110, 112' with at least one or more hyperlinks 114, 114' or icons 116, 116' embedded within, responsive to the control command 122 associated with the respective hyperlink 114 or icon 116 in the at least one hot corner 118; activating the at least one or more hot corners 108, 110, 112, 112" when the at least one image 156 within the coded frame 102 is scanned. It is understood that the coded frame 102 or the icons 116 can be any shape or figure of art, e.g. a blob, a teardrop, a fish, a frog, a triangle, a circle and the like.

Customs verification app 154 is also configured for playing the at least one media content 120 for the coded frame 102 or the captured at least one image 156 on the mobile device's displaying means 320 within the coded frame 102 pursuant to a control command 122 associated with any one or more embedded icons 116, 116' or hyperlinks 114, 114'; receiving at least one control command 122 for activating the at least one media content 120 within the coded frame 114 with full functionality for review and control when the media content 120 is for instance displayed. Media content 120 may be displayed either wholly within the frame or may be fully expanded to fit the screen of the mobile device's displaying means 320. Control command 122 as used herein include but are not limited to any one or more of the following: play, stop, fast-forward, rewind, pause, maximize viewing, minimize, end and cancel; retrieving the at least one media content 120, e.g. a security questions, customs information 106, agency bulletin, agency authentication information, warnings, passport information 126 (some or partial), travel authorization, visa restrictions, and the like, which is retrieved by linking to a website using a designated URL and the like. The at least one control command 122' associated with the at least one embedded icon 116 includes any one of the following: display media content 120, play audio for media content 120, link to an electronic address and the like.

Figure 3C:
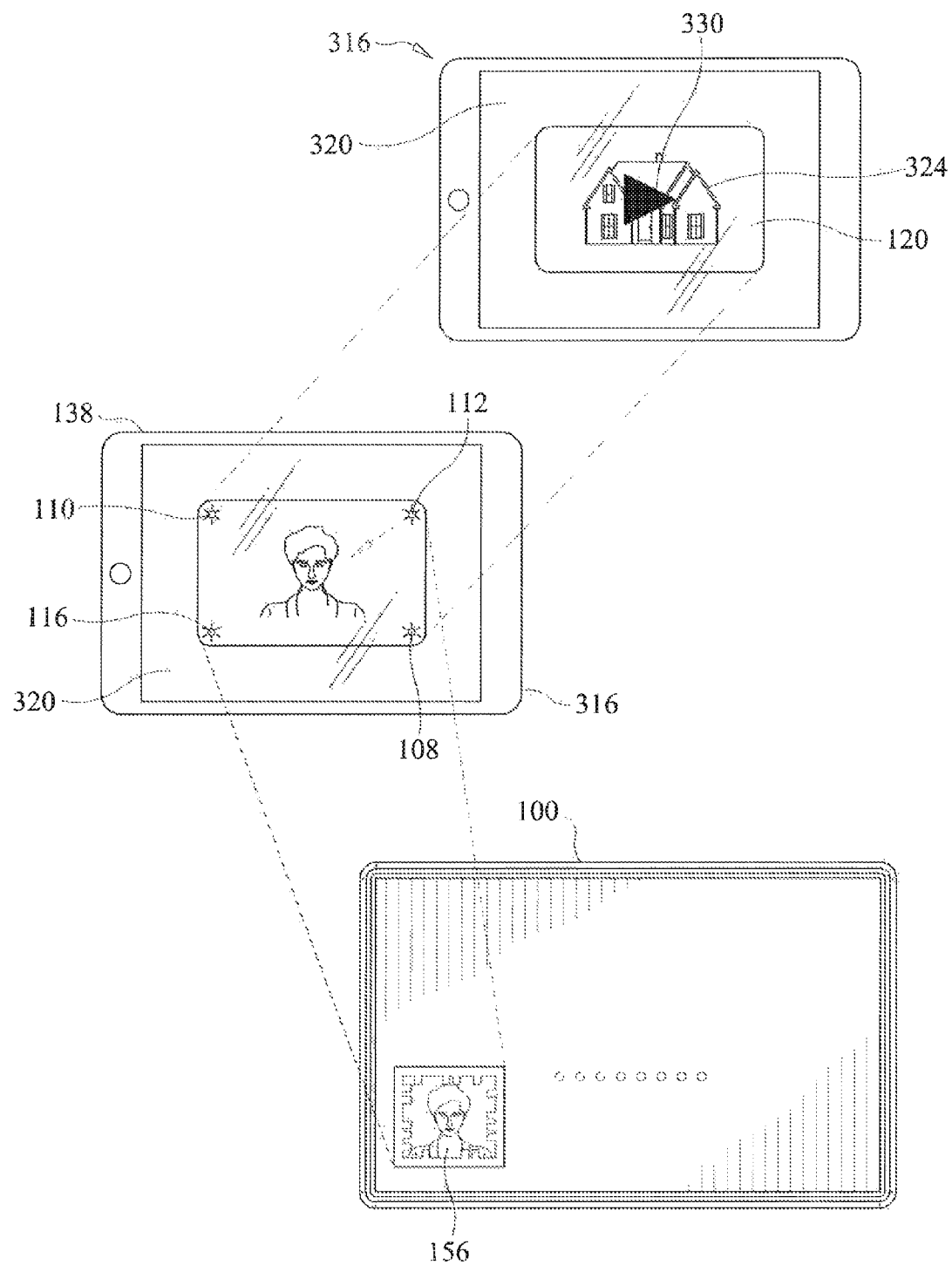
Figure 3D:
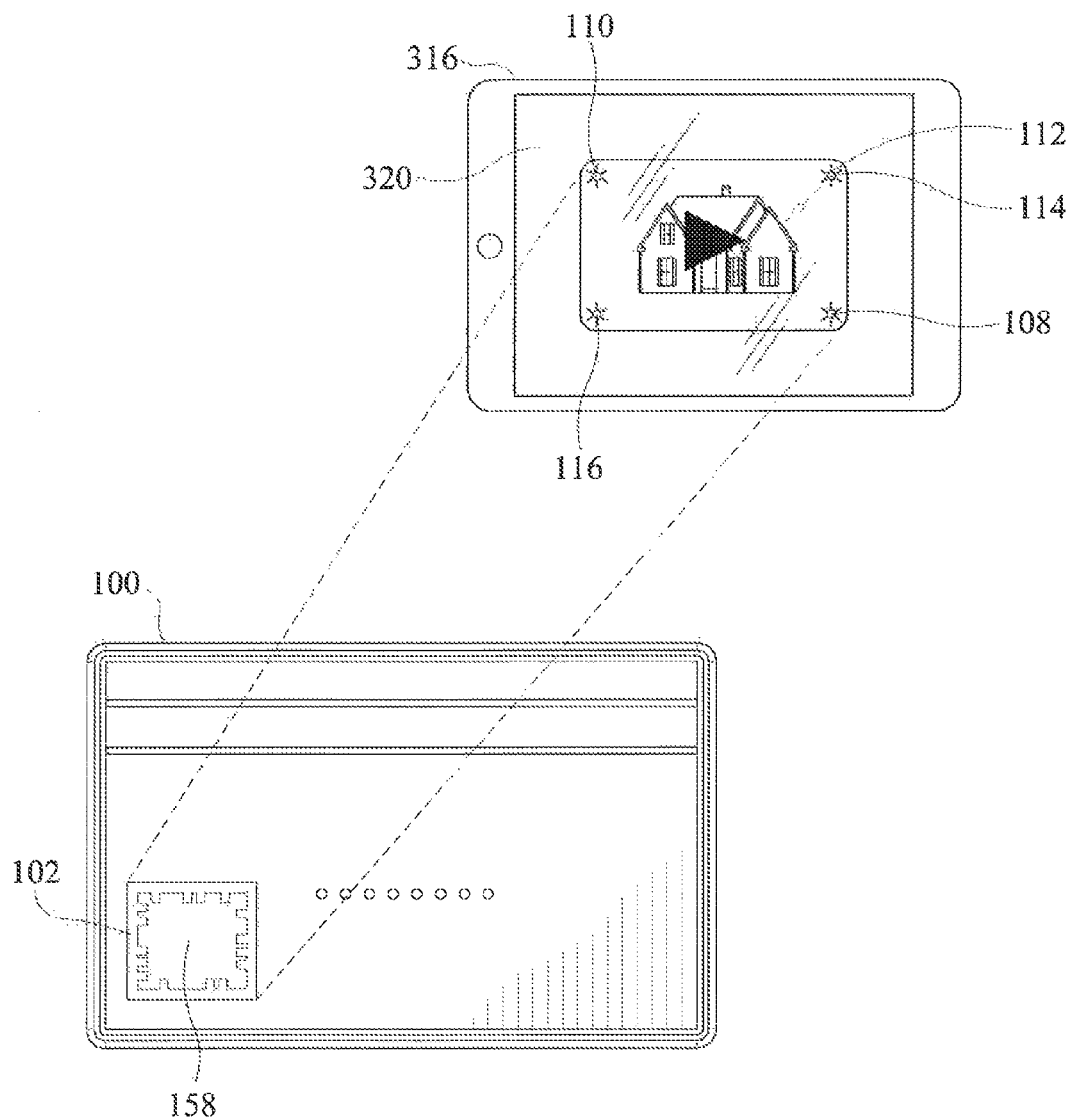

In some embodiments, as shown in FIGS. 3C & 3D, the immigration card 100 includes an image 156, where the customs verification app 154 is configured for controlling the media content 120 corresponding to the at least one image 156 within the coded frame 102 or designated area 158 by overlaying the at least one image 156 with at least one embedded icon 116 where the associated control command 122 controls the media content 120.

In some embodiments, the immigration card 100 does not include an image 156. As such, the customs verification app 154 is configured for controlling the media content 120 corresponding to the coded frame 102 by overlaying the designated display area 324 with the at least one embedded icon 116, which has an associated control command 122 for controlling the media content 120 as displayed on the displaying means 320.

Networked communication device 316 may include any kind of displaying means 320, such as, but not limited to: a liquid crystal display ("LCD") screen, a light emitting diode ("LED") display, touchpad or touch screen display, and/or any other means known in the arts for emitting a visually perceptible output. Networked communication device's microprocessor 132' is in electronic communication with its displaying means 320 and may be wirelessly connected to microprocessor 132'. Displaying means 320 may include control means, such as, but not limited to, a touch screen, a stylus, and the like that may be used to also control or input values or interact with the media content 120, e.g. responding to security questions. In some embodiments, displaying means 320 may be electronically connected to a networked communication device 316 according to the hardware and software protocols that are known and used in the arts. Computer central microprocessor 132 controls the networked communication device's displaying means 320, which is configured for displaying the at least one or more coded advertising images 114, media contents 120, 120' and the like.

Networked communication device 316 also includes software components that may be stored in the memory means 124'. Memory means 124' may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by networked communication device 316. Networked communication device 316 may also contain an input element for inputting data and an output element for displaying data.

Also stored on the memory means 124' may be an operating system 326, application manager 328, and the customs verification app 154. Customs verification app 154 may be an independent component or may be incorporated into the operating system 326. Customs verification app 154 is a computer-executable component, readable and executable by the computer microprocessor 132, wherein the customs verification app 154 links to the Internet 318 to retrieve at least one or more media contents 120, 120' to be displayed on the networked communication device's displaying means 320. The media contents 120, 120' may be in any format, e.g. audio, video, pictorial, text message, graphics, and as such is published or also broadcasted in any format on the networked communication device 316. In some embodiments, the biometric identifiers 314, 314' may be stored on the memory means 124 as the manifest for incoming flights may have already been made available such that visitors can be processed quickly as their biometric identifiers 314, 314' already reside locally with the system 300.

Application manager 328 comprises of computer-executable components that operate in the networked communication device 316 and may be implemented in a variety of ways. In one embodiment of the invention, application manager 328 may use one or more computer-executable components for interacting with customs verification app 154. In another embodiment, customs verification app 154 is incorporated in application manager 328 to receive information from the input element, to communicate with, and/or to control the operations of customs verification app 154.

Customs verification app 154 may comprise in part of a browser, such as for use on the networked communication device 316, or a similar browsing device. Customs verification app 154 may be any type of software application, such as a standalone application designed to run on a mobile platform, such as a networked communication device running an operating system 326, such as iOS™, Android™, Windows Mobile™, Blackberry™, and the like. Customs verification app 154 may be operative for an iPhone, any other "smart phone," networked communication device, cellular phone, PDA, GPS or any other networked communication device 316 capable of handling electronic transactions dealing with dynamic content, object, application, or software. In some embodiments, the customs verification app 154 may be designed to run on a social network platform, such as FACEBOOK® or JUSTSYNC®, and the like.

In some embodiments, customs verification app 154 may reside on a server computer 138 and may be downloadable from the server computer 138, the server computer's electronic database 326 or otherwise reside in the networked communication device's local memory means 124'. For example, in one embodiment, the customs verification app 154 may be on a networked communication device 316 (such as an iPhone, Blackberry, or other "smart phone") and the full-sized software program may be on a computer 138, where communications may occur over a network 318 or directly, either wired or wirelessly.

Referring back to FIGS. 3C & 3D, the networked communication device 316 may be used to scan the coded frame 102 and/or the image 156 within the coded frame 102 on the immigration card 100 for verification of the user's identity. For example, a Customs agent may use image capturing means 118, e.g. a networked communication device's camera, to scan or hover over the coded frame 102 and/or any image 156 within the coded frame 102 activating the undisplayed, embedded at least one or more hyperlinks 114, 114' or icons 116, 116'. Once the coded frame 102 and/or the image 156 is scanned the at least one or more hot corners 108, 110, 112, 112" with the at least one or more hyperlinks 114, 114' or icons 116, 116' are activated and viewable to be engaged for controlling interactive media content 120 pursuant to a control command 122 associated with at least one icon 116 or hyperlink 114 in the at least one hot corner 108. The activated at least one or more hot corners 108, 110, 112, 112" or icons 116, 116' may pulsate, blink or be displayed in a color contrast or animated to alert the user of the option to interact with the hot corners 108, 110, 112, 112" and/or the icons 116, 116' by exploring one or more of the interactive control commands 130, 130' associated with the icons 116, 116'. In some embodiments, the control command 122, 122' also becomes viewable and are displayed when the hot corners 108, 110, 112, 112" or icons 116, 116' are activated.

The icons 116, 116' or hyperlinks 114, 114' may be engaged on the networked communication device's displaying means 320 by overlaying the image 156 or the designated display area 324 within the coded frame 102 with at least one icon 116, which causes the customs verification app 154 to retrieve the media content 120. The interactive media content 120 may be stored on the immigration card's memory means 124, the remote computer server 136' or linked to a website or other URL, where the media content 120 may remain dynamic. Media content 120 includes passport information 126 such that if the immigration card 100 is a fake, since the passport information 126 that may be stored thereon is coded and viewable when scanned by a third-party Customs agent's communication device 316, the immigration and Customs agent is able to verify the information and quickly determine whether the immigration card 100 and/or the cardholder's is authorized for travel. For the security questions, such security questions may comprise of a randomly generated sequence based on the cardholder's known information with the issuing embassy, whereby the questions being posed are dynamic and may differ every time.

In some embodiments, once the networked communication device's image capturing means 118 hovers over the coded frame 102, it causes the application software 154 to automatically display the media content 120 that is associated with the coded frame 102. In some embodiments of the invention, the app 154 includes virtual radio buttons 330, 330' that may allow the user to further manipulate the image, e.g. play, rewind, fast forward, scroll text, or stop the media content 120, e.g. a video 120 being played. As such, the app 154 makes a determination of whether a corresponding media content 120 exists; conducts at least one electronic computerized search for the corresponding media content 120 to the extent that the media content 120 exists; retrieves the media content 120 for the coded frame 102 and/or the image 156; and display the media content 120 on the networked communication device's displaying means 114.

Once the media content 120 is retrieved, the card holder's passport information 126 and customs information 106, i.e. travel authorization can be determined. Responsive to the media content 120 displayed, if the Customs agent determines that the immigration card 100 is a fake or that the card holder needs further procession or apprehension, security can be immediately alerted by the Customs agent selectively engaging the covert activation switch 312 to alert security. Because the card reader 140 includes location determining means 306' the location of the Customs agent and/or immigration station can be readily determined without the card holder being aware that the alarm has been issued.

Methods

Figure 4:
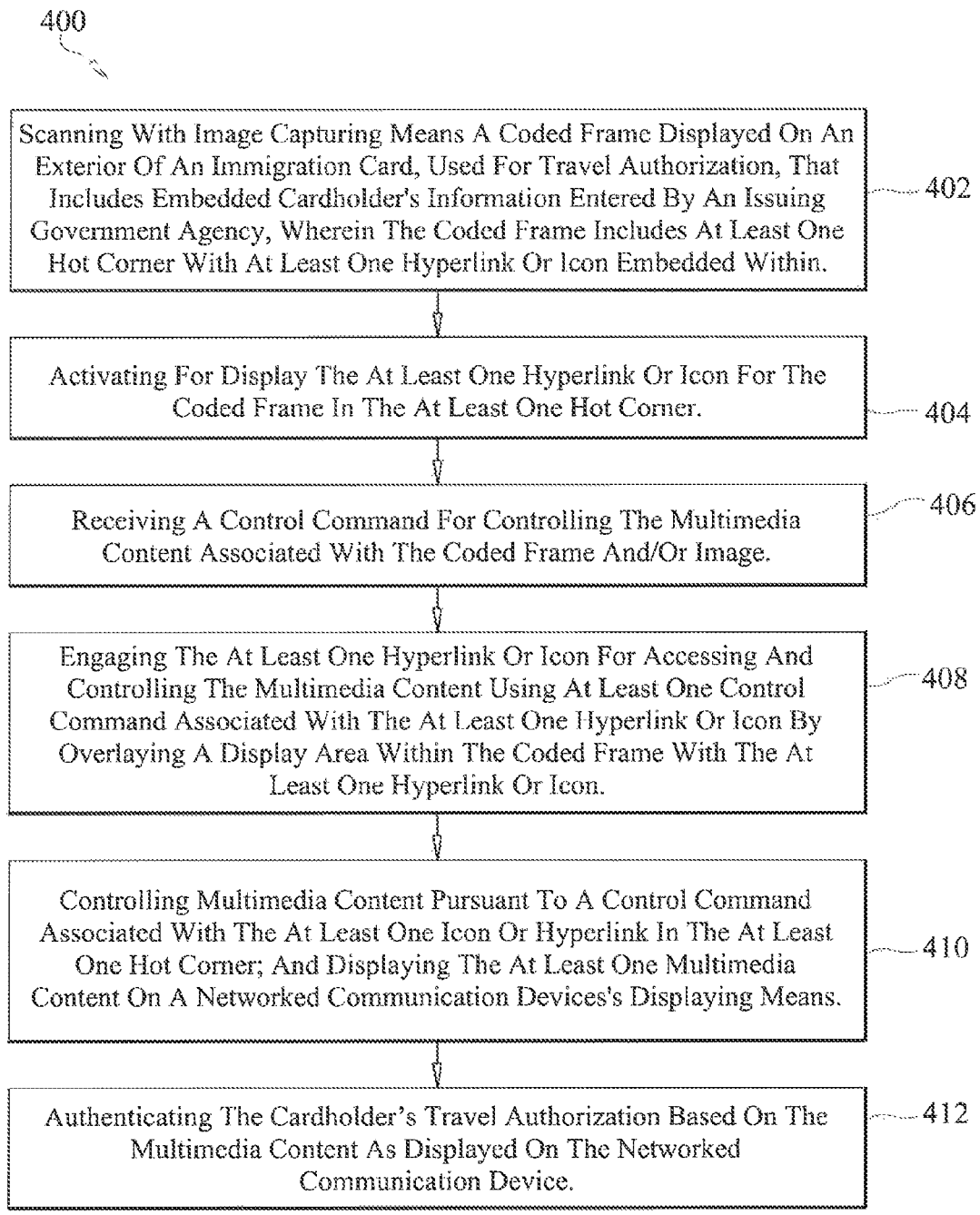
FIG. 4 shows an example of the method of the invention.

FIG. 4 shows an example of an exemplary method 400 according to one embodiment. Method 400 comprises of scanning with the networked communication device's image capturing means 118 a coded frame 102 displayed on the exterior 104 of an electronic immigration card 100 used for travel authorization, that includes embedded cardholder's customs information 106 entered by an issuing government agency that is electronically stored thereon, and wherein the coded frame 102 includes at least one or more hot corners 108, 110, 112, 112" with at least one hyperlink 114 or icon 116 embedded within (step 402).

Method 400 further comprises activating for display the at least one hyperlink 114 or icon 116 for the coded frame 102 or an image 156 in the at least one hot corner 112 (step 404); engaging the at least one hyperlink 114 or icon 116 for accessing and controlling the media content 120 by overlaying a display area 324 within the coded frame 102 with the at least one hyperlink 114 or icon 116 (step 406). By overlaying the display area 324 or the image 156 the at least one hyperlink 114 or icon 116 is activated and may pulsate, blink or displayed in a color contrast or animated to alert the user of the option to interact with the hot corners 108, 110, 112, 112" and/or the icons 116, 116' by exploring one or more of the interactive control commands 130, 130' associated with the icons 116, 116'.

Method 400 further comprises receiving a control command 122 for controlling the media content 120 associated with the coded frame 102 and/or image 156 (step 408) wherein the customs verification app 154 retrieves the media content 120 for display (step 410) from any one or more of the following sources: electronic database 124', the immigration card's memory means 124, hyperlinking to a Uniform Resource Locator or any other electronic address designated by the issuing government agency.

Method 400 further comprises controlling the media content 120 pursuant to a control command 122 associated with the at least one icon 116 or hyperlink 114 in the at least one hot corner 108 (step 412); and displaying the at least one media content 120 on a networked communication device's displaying means 320 (step 414). In some embodiments, the media content 120 may include a security question for which the immigration cardholder needs to answer correctly in order to gain entry or clearance for exit or entrance to a country's borders.

In some embodiments, method 400 further comprises authenticating the immigration cardholder's identity based on the media content 120 displayed on the networked communication device 316 pursuant to being retrieved by the customs verification app 154 upon scanning the coded frame 102. For example, the media content 120 may include security question(s) or a photograph that may be used to verify the cardholder's identity whereby either the cardholder will need to answer the security questions accurately and/or the retrieved photograph 128 needs to match the immigration and customs' records. The media content 120 may be displayed within the coded frame 102 or in some embodiments is not confined to the coded frame 102 as displayed on the displaying means 320 but will display to fit a displayable area on the networked communication mean's displaying means 320. In either event, the media content 120 may be controlled with full functionality for review and control using the control command 122 associated with the at least one embedded icon 116 or hyperlink 114 that has been activated and engaged. Such control command 122 associated with the at least one at least one hyperlink 114 or icon 116 includes any one of the following: display media content 120, link to government agency's website, or another designated website.

Figure 5:
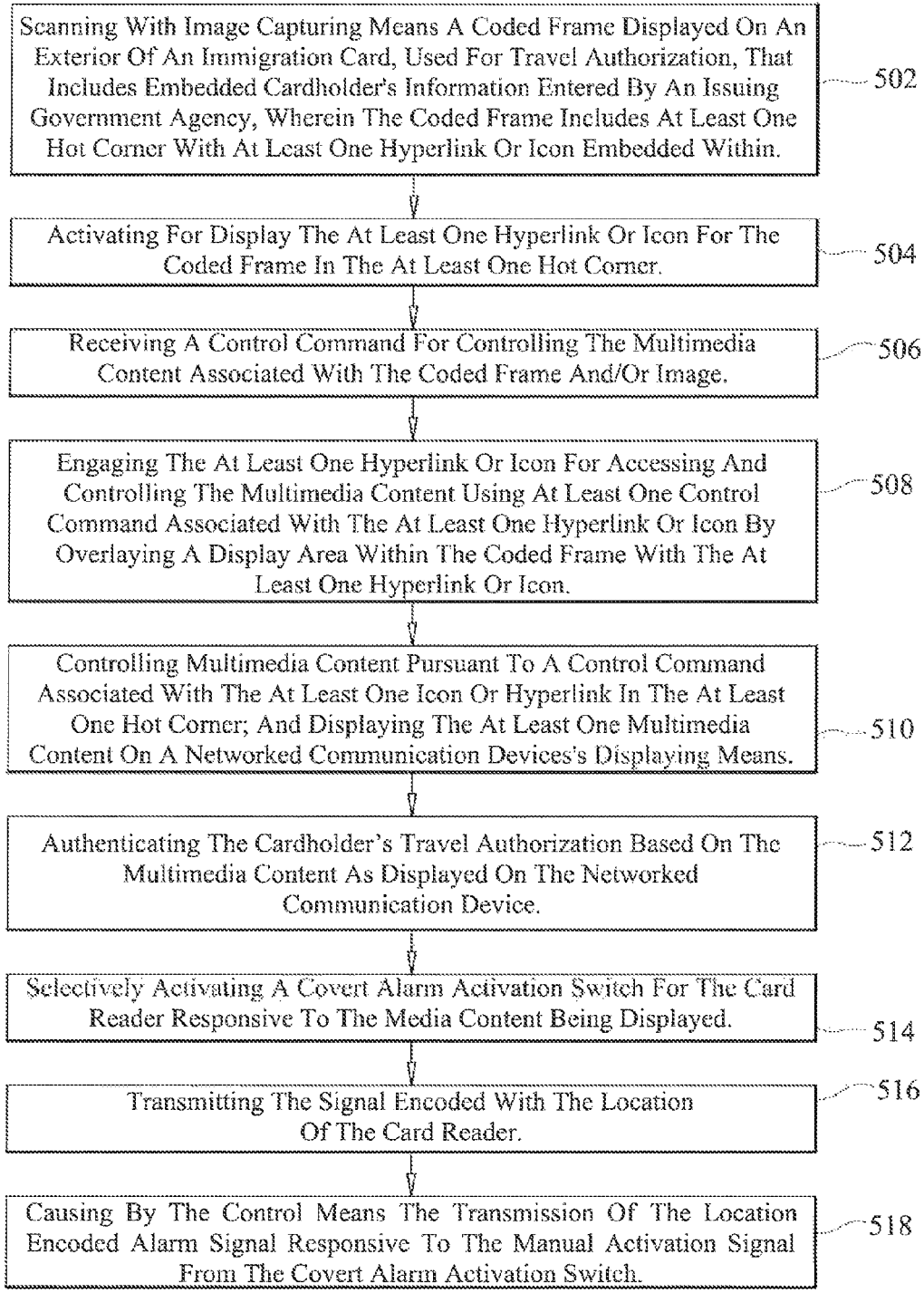
FIG. 5 shows an example of the method of the invention.

FIG. 5 shows an example of an exemplary method 500 according to one embodiment. Method 500 comprises of authenticating the cardholder using the methodology of steps 502-512 as exemplified and described in relation to FIG. 4, steps 402-412. Additionally, responsive to the media content 120 displayed, method 500 further selectively activating a covert alarm activation switch for the card reader 140 responsive to the media content 120 being displayed (step 414), transmitting the signal 310 encoded with the location of the card reader 140 by communication means 308 (step 416); and causing by the control means 132' the transmission of the location encoded alarm signal 310 responsive to a manual activation signal 310 from said covert alarm activation switch (step 418).

Hardware and Operating Environment

This section provides an overview of example hardware and the operating environments in conjunction with which embodiments of the inventive subject matter can be implemented.

A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
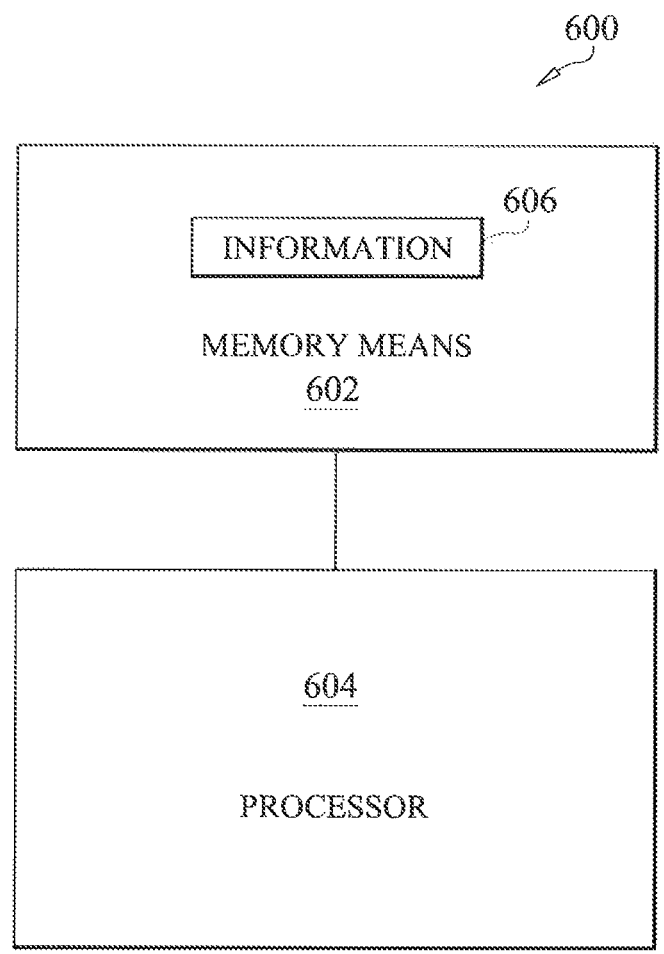
FIG. 6 is a block diagram representing an apparatus according to various embodiments.

FIG. 6 is a block diagram representing an apparatus 600 according to various embodiments. Such embodiments may comprise a computer, a memory system, a magnetic or optical disk, some other storage device, or any type of electronic device or system. The apparatus 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 604) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   an immigration card with at least one coded frame displayed on the immigration card's exterior that includes embedded customs information entered by an issuing government agency, wherein the customs information is activated for display by scanning the coded frame that includes at least one embedded hyperlink or icon within with image capturing means and upon activation, the activated at least one hyperlink or icon becomes visible and may be engaged for accessing corresponding media content for display, and for controlling the corresponding media content by overlaying on a display means, the image or a designated area within the coded frame with the activated at least one hyperlink or icon using at least one control command associated with the at least one hyperlink or icon; and
   a card reader in electronic communication with a computer processor, wherein the card reader comprises:
      biometric verification means positioned thereon and configured for activating the immigration card upon validation of cardholder's at least one biometric sample;
      location determining means for determining the location of the card reader;
      communication means for transmitting a signal encoded with the location of the card reader;
      an alarm activation switch that can be selectively activated to cause the communication means to transmit the signal encoded with the location of the card reader; and
      control means for causing the transmission of the location encoded alarm signal responsive to a manual activation signal from the alarm activation switch.

2. The system of claim 1, further comprising a networked communication device that comprises of:
   a computer processor, a non-transitory computer readable medium connected to the at least one processor that includes computer executable instructions stored on the non-transitory computer readable medium executable by the computer processor and configured for launching the customs verification application program, programmed for controlling the media content;
   image capturing means; and
   the displaying means for displaying the at least one media content.

3. The system of claim 2, wherein the customs verification application is further configured for displaying on the display means the at least one media content within the coded frame with functionality for review and control using the control commands.

4. The system of claim 1, further comprising an image displayed on any one or more of the following: within the coded frame, or the displaying means.

5. The system of claim 1, wherein the at least one media content includes any one or more of the following: customs information, agency bulletin, agency authentication information, warnings, identification verification information, travel authorization, visa restrictions, or questions.

6. The system of claim 1, wherein the at least one media content may be displayed in any one or more of the following formats: graphics, pictorial, video, audio, or text.

7. The system of claim 1, wherein at least one control command associated with the at least one at least one hyperlink or icon includes any one of the following: display media content, link to government agency's website, or link to a designated website.

8. The system of claim 1, wherein the customs verification app is further configured for retrieving the at least one media content by linking to a website.

9. The system of claim 1, wherein the control means comprises a programmed microcontroller.

10. The system of claim 9, wherein the covert alarm activation switch is used to enter a sequence of button presses indicative of whether an agent wishes to initiate the transmission of an alarm signal used to program the microprocessor.

11. The system of claim 1, wherein the covert alarm activation switch is used to enter a sequence of button presses indicative of whether an agent wishes to initiate the transmission of an alarm signal.

12. A method comprising:
scanning with image capturing means a coded frame, which includes at least one embedded hyperlink or icon, displayed on an exterior of an immigration card, used for travel authorization, that includes embedded customs information;
activating for display the at least one hyperlink or icon for the coded frame wherein the activated at least one hyperlink or icon becomes visible;
engaging the at least one hyperlink or icon for accessing corresponding at least one media content and controlling the media content using at least one control command associated with the at least one hyperlink or icon by overlaying on a display means, or a display area within the coded frame with the at least one hyperlink or icon;
receiving a control command for controlling the media content associated with the coded frame and/or image;
controlling media content pursuant to a control command associated with the at least one icon or hyperlink in the at least one hot corner;
displaying the at least one media content on a networked communication device's displaying means; and
selectively activating a covert alarm activation switch for a card reader responsive to the media content being displayed; and
transmitting the signal encoded with the location of the card reader by communication means;
causing by control means the transmission of the location encoded alarm signal responsive to a manual activation signal from said covert alarm activation switch.

13. The method of claim 12, further displaying the image on any one or more of the following: within the coded frame, or the displaying means.

14. The method of claim 12, wherein the at least one media content includes any one or more of the following: customs information, agency bulletin, agency authentication information, warnings, identification verification information, travel authorization, visa restrictions, or questions.

15. The method of claim 12, further comprising displaying the at least one media content in any one or more of the following formats: graphics, pictorial, video, audio, or text.

16. The method of claim 12, further comprising displaying on the display means the at least one media content within the coded frame by a customs verification application with functionality for review and control using the control commands.

17. The method of claim 12, wherein at least one control command associated with the at least one at least one hyperlink or icon includes any one of the following: display media content, link to government agency's website, or link to a designated website.

18. The method of claim 12, further comprising retrieving the at least one media content by linking to a website.

19. The method of claim 12, wherein the control means comprises a programmed microcontroller.

20. The method of claim 12, wherein the covert alarm activation switch is used to enter a sequence of button presses indicative of whether an agent wishes to initiate the transmission of an alarm signal.

* * * * *